(12) United States Patent
Jensen (10) Patent No.: US 12,064,002 B2
(45) Date of Patent: Aug. 20, 2024

(54) ARTICLE OF FOOTWEAR

(71) Applicant: ECCO Sko A/S, Bredebro (DK)

(72) Inventor: Frank Jensen, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 0 days.

(21) Appl. No.: 17/358,437

(22) Filed: Jun. 25, 2021

(65) Prior Publication Data

US 2021/0401113 A1   Dec. 30, 2021

(30) Foreign Application Priority Data

Jun. 26, 2020   (EP) .................................... 20182457

(51) Int. Cl.
| | |
|---|---|
| A43B 13/12 | (2006.01) |
| A43B 9/18 | (2006.01) |
| B29D 35/10 | (2010.01) |

(52) U.S. Cl.
CPC .............. *A43B 13/122* (2013.01); *A43B 9/18* (2013.01); *B29D 35/10* (2013.01)

(58) Field of Classification Search
CPC ....... A43B 13/122; A43B 13/12; A43B 13/04; A43B 13/14; A43B 13/181; A43B 13/187; A43B 13/223; A43B 9/18
See application file for complete search history.

(56) References Cited

U.S. PATENT DOCUMENTS

| | | | | |
|---|---|---|---|---|
| 3,087,262 | A * | 4/1963 | Russell ................ | A43B 13/181 36/28 |
| 3,812,604 | A * | 5/1974 | Sato ........................ | A43B 9/18 12/142 RS |
| 5,367,791 | A * | 11/1994 | Gross ..................... | A43B 13/26 36/31 |
| 8,914,998 | B2 * | 12/2014 | Gheorghian ......... | A43B 13/141 36/103 |
| 9,254,591 | B2 * | 2/2016 | Fox ......................... | B32B 5/20 |
| 10,856,610 | B2 * | 12/2020 | Ng ....................... | A43B 17/023 |
| 11,291,273 | B2 * | 4/2022 | Hartmann ............... | A43B 1/04 |
| 2003/0204920 | A1 * | 11/2003 | Liu ...................... | B29D 35/148 12/145 |
| 2008/0229617 | A1 * | 9/2008 | Johnson ............... | A43B 3/0057 36/102 |
| 2011/0179668 | A1 | 7/2011 | Fleming et al. | |
| 2013/0019499 | A1 * | 1/2013 | Hsu ..................... | A43B 17/006 36/44 |

(Continued)

OTHER PUBLICATIONS

EP Extended Search Report for corresponding EP Patent Application No. 20182457.0 dated Oct. 22, 2020, 7 pages.

*Primary Examiner* — Bao-Thieu L Nguyen

(74) *Attorney, Agent, or Firm* — Lee & Hayes, P.C.

(57) ABSTRACT

An article of footwear includes an upper having a first ground facing surface. A primary sole part has a first foot facing surface and a second ground facing surface. The first foot facing surface includes a plurality of openings. Each opening defines a volume extending in a vertical direction from the first foot facing surface towards the second ground facing surface, which has a closed end. A secondary sole part has a second foot facing surface and a third ground facing surface. The secondary sole part is arranged between the upper and the primary sole part and extends into the plurality of volumes and/or openings in the first foot facing surface of the primary sole part.

8 Claims, 5 Drawing Sheets

(56) References Cited

U.S. PATENT DOCUMENTS

| | | | |
|---|---|---|---|
| 2014/0310986 A1* | 10/2014 | Tamm | A43B 13/14 |
| | | | 12/142 T |
| 2017/0238652 A1* | 8/2017 | Langvin | A43B 13/141 |
| 2018/0035751 A1* | 2/2018 | Rehagen | A43B 13/181 |
| 2018/0077997 A1* | 3/2018 | Hoffer | A43B 7/141 |
| 2019/0225784 A1* | 7/2019 | Farr | B32B 27/18 |
| 2019/0239596 A1 | 8/2019 | Ploem | |
| 2020/0245726 A1* | 8/2020 | Hartmann | A43D 25/06 |
| 2020/0275739 A1* | 9/2020 | Linkfield | A43B 13/127 |
| 2021/0315319 A1* | 10/2021 | Klein | A43B 13/141 |
| 2021/0401113 A1* | 12/2021 | Jensen | A43B 9/18 |

\* cited by examiner

ARTICLE OF FOOTWEAR

This application claims priority to 20182457.0, filed Jun. 26, 2020, an entirety of which is incorporated herein by reference.

TECHNICAL FIELD

The present disclosure relates to an article of footwear comprising a primary sole part and a secondary sole part. The secondary sole part is injection moulded onto the primary sole part.

BACKGROUND

In shoe production there are a number of ways to manufacture a pair of shoes, where the manufacturing method, the choice of material, the form of the upper, the form and material of the midsole, and the form and shape of the outsole have a huge impact in how the shoe performs. There are a number of different types of shoes, such as hiking boots, sport shoes, golf shoes, running shoes where the shoes have different qualities such as the stiffness of the upper, the stiffness of the outsole or midsole, where the qualities of the shoe are controlled by different factors.

One of the important factors for producing a specific type of shoe, that acts in a certain way is the design, shape and hardness of the sole of the shoe. This has traditionally been done by introducing items such as shanks or embedded reinforcement elements to improve the stiffness of the material in a certain area, while maintaining a certain flexibility in other areas or to apply reinforcements to the outer surfaces of the sole in order to change the characteristics of the sole.

In direct injection moulding techniques for shoes, the sole and/or the outsole of the shoe is injected directly to the upper of the shoe, where a last holds the upper, and a mould having the shape of the sole is introduced onto the upper and a thermoplastic material is injected directly onto the upper, fixing the midsole and/or the outsole to the upper. This means that the outsole is injected directly onto the upper, and there is no need for adhering or otherwise fixing the midsole/outsole to the upper.

In direct injection moulding techniques, the introduction of reinforcement elements inside the midsole, requires a modification of the mould and the equipment needed to manufacture the shoe, which is time consuming and may be expensive, in view of simpler shoes, that do not have reinforcement elements, and where the midsole is uniform throughout the shoe. Furthermore, in order to provide complex midsoles, where certain areas are reinforced, while others are flexible, may require a number of different steps of injection moulding, using a number of different moulds to obtain the required properties. This is both costly and time consuming for manufacturing purposes.

Thus, there is a need to improve the structure of a shoe, where a certain property may be obtained through simpler means, using a simplified design of the shoe, to obtain certain reinforcement or flexibility properties in the shoe.

GENERAL DESCRIPTION

In accordance with the present description, there is provided an article of footwear comprising: an upper having a first ground facing surface; a primary sole part having a first foot facing surface, and a second ground facing surface, the first foot facing surface comprising a plurality of openings, each opening defining a volume extending in a vertical direction from the foot facing surface towards the ground facing surface and having a closed end; and a secondary sole part having a second foot facing surface and a third ground facing surface, wherein the secondary sole part is arranged between the upper and the primary sole part and extends into the plurality of volumes and/or openings in the first foot facing portion of the primary sole part.

By providing a primary sole part comprising a plurality of openings, wherein each opening defines a volume having a closed end for receiving a secondary sole part, such as an injected material, an improved connection between the primary sole part and the secondary sole part may be provided. Furthermore, as the second sole part is received in the plurality of openings, the second sole part may be capable of providing a layer of material between the primary sole part and the upper, where the second sole part may improve a predefined characteristic of the article of footwear, such as a weight and/or a softness of the article of footwear, while the material of the primary sole part surrounding the openings provide a stiffness to the article of footwear.

The primary sole part may be any kind of sole part that may provide the article of footwear with an aesthetic look and/or a functional characteristic, where the secondary sole part may provide the article of footwear with a functional characteristic such as shock absorption between the ground facing surface of the upper and the primary sole part. The provision of a primary sole part may e.g. mean that the primary sole part may be provided in a material that is durable, and capable of tolerating contact with the ground, wherein the secondary sole part may be provided in a material that is lighter and/or provides a softer feel to the article of footwear. Thus, the primary sole part material and the secondary sole part materials may be made of different materials, having different properties.

The injected material may fill out the plurality of openings of the first foot facing surface, where the injected material may constitute the secondary sole part when the article of footwear has been constructed. The secondary sole part may provide the article of footwear with a layer which is positioned between the upper and the ground, so that the secondary sole part may e.g. provide a dampening layer in the sole of the article of footwear. The secondary sole part may fill out at least part of the plurality of volumes. The secondary sole part is positioned between the primary sole part and the first ground facing surface of the upper. The injected material may bond to the foot facing surface of the primary sole part when the injected material expands and cures, so that the injected material fills out the plurality of volumes and/or openings on the foot facing surface of the primary sole part.

Within the context of the present description the term volume may be seen as an amount of space, measured in cubic units, such as cubic millimetres ($mm^3$), cubic centimetres ($cm^3$), etc. where a three-dimensional object of a fluid and/or a solid may occupy the volume. The volume may e.g. be defined as an open volume and/or a closed volume, wherein an open volume has at least one open side and a closed volume is closed on each side.

The secondary sole part may be seen as a part of an article of footwear where the secondary sole part bonds the primary sole part to the ground facing surface of the upper. The primary sole part may have a first hardness and the secondary sole part may have a second hardness, where the first hardness may be greater than the second hardness. The first hardness of the first sole material may be utilized to improve traction by providing traction elements on the ground facing surface of the primary sole part, to improve durability by providing the primary sole in a material that is capable of tolerating friction between the ground surface and the ground facing surface of the primary sole part. The secondary sole part may be provided in a material that has a second hardness that is lower than the first hardness, where the secondary sole part may be positioned between the foot of the wearer, when used, and the primary sole part and the ground. Thus, the softer material may improve the comfort of the article of footwear by providing a dampening layer that can absorb shocks that occur during gait.

Since the primary sole part has to be durable in order to withstand the friction between the ground facing surface of the primary sole part and the ground, the primary sole part is typically relatively heavy. By providing open volumes in the primary sole part and filling these volumes with a lighter material of the secondary sole part the weight of the assembled article of footwear may be reduced with improves user comfort.

The article of footwear may e.g. be manufactured by premanufacturing the upper and the primary sole part. The construction of the article of footwear may be finalized by injecting the injected material into one or more of the plurality of volumes and/or openings of the primary sole part, and positioning the upper in its correct position relative to the primary sole part, so that the injected material expands, and fills up one or more of the plurality of volumes, thereby creating the secondary sole part. The primary sole part and/or the secondary sole part may comprise a thermoplastic polymer, such as thermoplastic rubber (TPR), Thermoplastic polyurethane (TPU), or polyurethane (PU), or a combination thereof. The secondary sole material may be a polyurethane foam, which expands into a mould cavity. The primary sole material may be a thermoplastic polyurethane.

The article of footwear may thereby have an increased flexibility across the primary sole part and/or the second sole part, allowing the article of footwear to bend in a plurality of directions, while maintaining stability in the areas having openings filled with second sole parts. During use, the secondary sole part may absorb the weight of the user in the areas of the opening, while the lack of secondary sole part in the regions between openings allows for increased flexibility of the sole assembly.

In some exemplary embodiments, the primary sole part defines a mould cavity of the secondary sole part, where the plurality of open volumes and/or openings of the primary sole part may define, at least part of, the mould cavity for receiving the injected material of the secondary sole part. Each of the open volumes may define a cavity, where the cavity may provide a cavity surface area, where the cavity may have a side and/or a bottom wall, where the shape of the cavity may be adapted to increase the surface area where the injected material may bond with the primary sole part. The plurality of open volumes may be one or more cavities provided in the foot facing surface of the primary sole part, where the plurality of open volumes may provide an increased surface area in the upper facing surface of the primary sole part. Thus, the injected material and/or the secondary sole part may penetrate the plurality of open volumes, so that the injected material may bond with the surface area of the open volumes. Within the meaning of the present description the open volume may be a cavity, a compartment, a hole, a chamber, an opening and/or an receptacle, or any type of hollow space that allows for the access of a material that may be injected into the space.

In some exemplary embodiments, the primary sole part and/or the ground facing surface of the upper defines part of a mould cavity of the secondary sole part. Thus, when the secondary sole part is injection moulded into the mould cavity the direct injection moulding holds the primary sole part in its position, while the plurality of volumes of the primary sole part defines part of an outer surface of the secondary sole part. The ground facing surface of the upper may define an upper part of the mould cavity for the secondary sole part, while the primary sole part may define a bottom part of the mould cavity.

In some exemplary embodiments, the sole assembly of the article of footwear may be a layered construction, where the primary sole part may be an outsole for an article of footwear, where the primary sole part may define the part of the footwear that comes into contact with the ground during normal use.

In some exemplary embodiments, the sole assembly of the article of footwear may be a layered construction where the secondary sole part may be a midsole for the article of footwear. The midsole may be primarily for shock absorption and/or to provide the article of footwear with a layer that may dampen the contact between the foot of the wearer and the ground.

In some exemplary embodiments, the plurality of volumes may be defined as one or more cubic space(s) in the foot facing surface of the primary sole part. The plurality of volumes may form part of the mould cavity, which may also be referred to as a main volume, defining the second sole part. An upper part of the main volume may abut the ground facing surface of the upper, and a lower part of the main volume may abut the foot facing surface of the primary sole part.

In some exemplary embodiments, a peripheral limit of each of the plurality of volumes may be defined by a side wall, where the side wall may be part of the primary sole part. Each of the plurality of volumes may be an opening in an upper part of the primary sole part, and where the opening is closed in a bottom and/or a side part of the opening. Thus each of the plurality of volumes may be limited by a side wall and/or a bottom wall having an inner surface, so that the injected material can penetrate the opening, so that when the injected material cures, the injected material may bond to the inner surface of the side wall and/or the bottom wall of the opening.

The plurality of open volumes may be in fluid communication with the main volume, so that when the injected material is introduced into the main volume, the injected material may flow into the plurality of open volumes via the main volume during expansion or under pressure.

In some exemplary embodiments, the secondary sole part may be direct injection moulded into the plurality of open volumes and/or openings of the primary sole part. The injected material may form the secondary sole part, where the injected material may be introduced into the plurality of open volumes of the primary sole part. When the injected material has expanded and cured the injected material may form the secondary sole part. The use of direct injection moulding for forming the secondary sole part means that the secondary sole part will adapt to the form of the primary sole part and the ground facing surface of the upper. This means that the injected material will fill out the plurality of open volumes so that the injected material will penetrate and expand into all parts of each of the plurality of open volumes.

The article of footwear may be manufactured using direct injection moulding equipment, where the upper and the primary sole part may be positioned in a mould, and where the injected material may be positioned inside the plurality of open volumes prior to closing the mould. The mould may comprise a side part, wherein the side part and/or the tertiary sole part may form a peripheral part of the mould. The upper and the primary sole part may be positioned at a distance from each other in the mould, such that a main volume is created between the upper, the primary sole part and the side part of the mould and/or the tertiary sole part. Thus, the injected material may expand and cure inside the mould, so that the upper and/or the primary sole part are maintained in their position during the expansion of the injected material, so that when the injected material cures, the injected material bonds the primary sole part to the upper, via a secondary sole part, i.e. the cured injected material.

In some exemplary embodiments, the secondary sole part extends from the first ground facing surface of the upper to the first foot facing surface of the primary sole part, and/or where the secondary sole part defines a second foot facing surface that is attached to the first ground facing surface of the upper and a third ground facing surface that is attached to the first foot facing surface of the primary sole part. The secondary sole part may be adapted to attach the primary sole part to the upper, where the secondary sole part extends in a vertical direction between the ground facing part of the upper towards the first foot facing surface of the primary sole part. Thus, the secondary sole part may bond to the first foot facing surface and the first ground facing surface. The secondary sole part may extend from a medial side primary sole part to a lateral side of the primary sole part, so that the primary sole part is attached to the upper from a medial side and continuously towards a lateral side.

In some exemplary embodiments, the primary sole part comprises a peripheral surface defining an attachment area adapted to accommodate a tertiary sole part, optionally where the tertiary sole part has a radial inwards facing surface for attachment to the peripheral surface of the primary sole part and an outwards facing surface. The attachment area may also be on a peripheral part of the primary sole part, where the attachment area may have a vertical attachment area that may have a surface area that has third normal, where the third normal may be orthogonal to a vertical axis of the article of footwear. The tertiary sole part may be a trim that may extend along the peripheral part of the primary sole part, where the trim may be of a different material than the primary sole part. The trim may e.g. made out of leather, rubber, or other suitable material. The trim may extend along the entire periphery of the primary sole part, creating an uninterrupted trim along the periphery of the primary sole part. Thus, the trim may be a closed line around the periphery of the primary sole part. The trim may also be provided with cut-outs extending in a lateral direction of the article of footwear. The cut-outs may reduce rigidity of the tertiary sole part and thus provides for an increased flexibility of the sole assembly.

The tertiary sole part may define the terminal peripheral part of the primary sole part, when attached to the primary sole part. Thus, the tertiary sole part may abut the side wall of the upper when the secondary sole part is injected, so that the tertiary sole part closes off the main volume relative to the ground facing part of the upper.

The tertiary sole part may e.g. be adhered to the primary sole part, e.g. by injection moulding the tertiary sole part to the primary sole part.

The sole assembly may be an assembly of the primary sole part, secondary sole part, tertiary sole part, and/or any subsequent sole part. The sole assembly may be the part of the article of footwear that is between the ground and the upper, during use.

In some exemplary embodiments, the secondary sole part may be enclosed by the primary sole part, so that the second sole part cannot be seen or accessed from the outside of the article of footwear. This may e.g. be understood that the second sole part cannot be accessed or be seen without penetrating the primary sole part and/or the upper. Thus, the primary sole part, the tertiary sole part and/or the ground facing surface of the upper may enclose the secondary sole part and/or the main volume, so that the space which the injected material expands into is closed from all sides. This may therefore mean that the main volume is a closed volume, where one part of the volume is closed by the upper, and the remaining closure of the volume may be obtained by the primary sole part. The open volumes comprised in the primary sole part may however be open towards the main volume. In other words, the primary sole part may define the outer surface of the sole assembly of the article of footwear. This may mean that the secondary sole part may be hidden by the primary sole part and may therefore not be visible when the article of footwear has been produced. The secondary sole part may extend uninterrupted, so that the secondary sole part may provide dampening and/or shock absorption along the entire length of the sole assembly, from the heel end towards the toe end. Optionally, the secondary sole part may extend the entire width of the sole assembly, from the toe end towards the sole end creating a dampening element between the primary sole part and the second sole part along the entire width and length of the sole assembly.

In some exemplary embodiments, the plurality of openings and/or open volumes extend, i.e. are arranged, from a heel end or a heel area of the primary sole to a forefoot area of the primary sole part in a plurality of parallel rows extending in a lateral direction of the primary sole part. The plurality of openings and/or open volumes may be arranged to extend over the majority of the foot facing surface of the primary sole part. By providing open volumes over a majority of the primary sole part the weight of the primary sole part may be reduced. Furthermore, the surface area to which the secondary sole part can bond is increased which provides a stronger bond between the primary and secondary sole part.

In some exemplary embodiments, the second ground facing surface comprises a ground contacting surface. When the primary sole part is an outsole, the ground facing surface of the primary sole part is the lowest part of the article of footwear and will thus be the ground contacting surface during use of the article of footwear.

The secondary sole part may be arranged to extend the entire length of the sole assembly and/or the article of footwear from the toe end to the heel end. The secondary sole part may extend uninterrupted, so that the secondary sole part may provide dampening and/or shock absorption along the entire length of the sole assembly, from the heel end towards the toe end. Optionally, the secondary sole part may extend the entire width of the sole assembly, from the toe end towards the sole end creating a dampening element between the primary sole part and the second sole part along the entire width and length of the sole assembly.

Within the understanding of the present description, the primary sole part may be an outsole for an article of footwear, such as a shoe, and/or where the second sole part may be a midsole for an article of footwear, such as a shoe.

In accordance with the description there is further provided a primary sole part having; a first foot facing surface, and a second ground facing surface. The foot facing surface comprises a plurality of openings defining a plurality of open volumes having a closed end for receiving an injected material, wherein the open volume extends in a vertical direction from the foot facing surface towards the ground facing surface. The foot facing surface is configured to be joined to an upper by receiving an injected sole material extending between a ground facing surface of the upper and the foot facing surface of the primary sole part.

In some exemplary embodiments, each of the plurality of open volumes may be enclosed by one or more sidewalls, the one or more sidewalls extending from the foot facing surface, in a direction perpendicular to the foot facing surface, towards the ground facing surface.

In some exemplary embodiments, each opening of the plurality of openings is arranged at a predetermined distance from one or more second openings of the plurality of openings. The plurality of openings are thus connected by solid sections of the primary sole part, such as solid sections of the foot facing surface. The solid sections provide reinforcement and durability to the sole assembly. The solid sections also provide the surface to which the second sole part, such as the injected material bonds to the primary sole part.

In some exemplary embodiments, the plurality of openings are distributed from a heel end of the foot facing surface to a toe end of the foot facing surface in a plurality of parallel rows extending in a lateral direction of the primary sole part.

In some exemplary embodiments, the primary sole part comprises a first set of grooves arranged on the ground facing surface, the first set of grooves having a longitudinal extension in a lateral direction of the ground facing surface, and wherein each groove is located between a respective first and second row of openings, such that an inner surface of each groove define an outer surface of one or more sidewalls enclosing the one or more open volumes. The bottom of each groove is a solid section of the primary sole part connecting each of the rows of openings. The one or more open volumes may thus be seen as hollow closed end protrusions extending from the foot facing surface towards the ground facing surface. The hollow closed end protrusions are thus connected by solid sections of the primary sole part in an area of the foot facing surface, such as by the bottom of the first set of grooves. The solid sections connecting the row of openings may have a thickness of 3-25%, preferably 5-15%, of the thickness of the primary sole part. This reduces the rigidity of the primary sole part along the grooves and provides for a sole having a high flexibility and thus improved comfort for a user of the article of footwear.

In some exemplary embodiments, the plurality of openings may be distributed from a heel end of the foot facing surface to a toe end of the foot facing surface in a plurality of rows extending in a longitudinal direction of the primary sole part. The plurality of rows of openings are, on the foot facing surface, separated by solid sections of the primary sole part. The solid sections of the primary sole part may, on the foot facing surface, be shaped as ridges connecting the openings. On the opposite ground facing surface, the ridges may form valleys separating the side walls of the plurality of open volumes.

In some exemplary embodiments, the primary sole part comprises a second set of grooves arranged on the ground facing surface, the second set of grooves having a longitudinal extension in a longitudinal direction of the ground facing surface, and wherein each groove is located between a respective first and second longitudinally extending row of openings.

In some exemplary embodiments, a ground facing surface of the closed end of the plurality of open volumes having a closed end comprises a ground contacting surface.

In some exemplary embodiments, the second sole part may have a connecting portion, where the connecting portion extends in a region between the ground facing surface of the upper and the top part of the foot facing surface of the primary sole part. The connecting portion may have a thickness that is uniform in a longitudinal and/or lateral direction, so that the thickness of the connecting portion is the same at two or more interconnecting portions (regions connecting two adjacent openings/volumes, ridges) of the primary sole part. Thus, the connecting portion may provide a uniform thickness along the ground facing surface of the upper in areas having interconnecting portions.

In some exemplary embodiments, at least a part of the foot facing surface of the primary sole part may have a curvature that corresponds to the curvature of the ground facing surface of the upper. Thus, the thickness of the secondary sole part in the areas having interconnecting portions (ridges) may be similar or equal in two or more longitudinal and/or lateral positions along the first sole part and/or the second sole part.

In some exemplary embodiments, the volume of the primary sole part may be defined by one or more side walls that enclose the volume from a radial direction, and where the closed end defines the bottom of the volume. The side walls may be defined by longitudinal and/or lateral grooves extending in a longitudinal and/or lateral direction along the primary sole part. Thus, each volume/opening may be defined along by one or more side walls and a bottom and be open in the top, i.e. in a direction towards the upper.

In some exemplary embodiments, the openings are provided in a central area of the primary sole part, and/or are distributed along the longitudinal length of the primary sole part or the lateral width of the sole part. Thus, it is possible to provide an increased flexibility along the entire primary sole part and/or secondary sole part.

In some exemplary embodiments, the secondary sole part is attached to the first ground facing surface of the upper and the first foot facing surface of the secondary sole part. Thus, the secondary sole part may be utilized to attach the primary sole part to the upper.

In some exemplary embodiments, each opening or volume may be separated from an adjacent opening/volume in an area close to the ground facing surface of the primary sole part. Two adjacent volumes may be connected via an interconnecting portion, which may be part of the primary sole part, and where the thickness of the secondary sole part is greater in the opening/volume than in the interconnecting portion. Thus, the difference in thickness may mean that the interconnecting portion and the corresponding second sole part may bend easily, while the volume and its corresponding secondary sole part which fills the volume may be more rigid than the first part, allowing the sole assembly to bend across the interconnecting portion.

In some exemplary embodiments, the secondary sole part may form a peripheral boundary of a sole assembly of the article of footwear, where the secondary sole part may enclose the primary sole part in a peripheral area of the primary sole part. The peripheral area of the primary sole part may be seen as peripheral edge of the primary sole part in either longitudinal direction or in a lateral direction. Thus, the primary sole part may be hidden in the peripheral area, as it may be covered with the secondary sole part, while the ground facing surface of the primary sole part may be visible.

In some exemplary embodiments, the openings/volumes may be distributed along a forefoot part of the primary sole part, an arch part of the primary sole part and/or a heel part of the primary sole part.

In some exemplary embodiments, the primary sole part may have two or more openings/volumes adjacent to each other in a lateral (transverse) direction. In some exemplary embodiments, the primary sole part may have two or more openings/volumes adjacent to each other in a lateral (transverse) direction in two or more parts of the primary sole part.

In some exemplary embodiments, the volume may be in the range of 0.1-2 $cm^3$, or more specifically between 0.2-1.5 $cm^3$, or more specifically between 0.3-1 $cm^3$. In some exemplary embodiments, the volume may be larger than 0.1 $cm^3$, or more specifically larger than 0.2 $cm^3$, or more specifically larger than 0.3 $cm^3$. The volume may be assessed from the edge of the opening and towards the bottom of the opening and may be bound by the side walls of the opening. In some exemplary embodiments, the second sole part may have a first thickness in a first area of the primary sole part that is void of an opening, e.g. in an area between two openings, and where the second sole part may have a second thickness in a second area of the first sole part that is void of an opening.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

BRIEF DESCRIPTION OF THE DRAWINGS

The following is an explanation of exemplary embodiments with reference to the drawings, in which.

DETAILED DESCRIPTION

Figure 1:
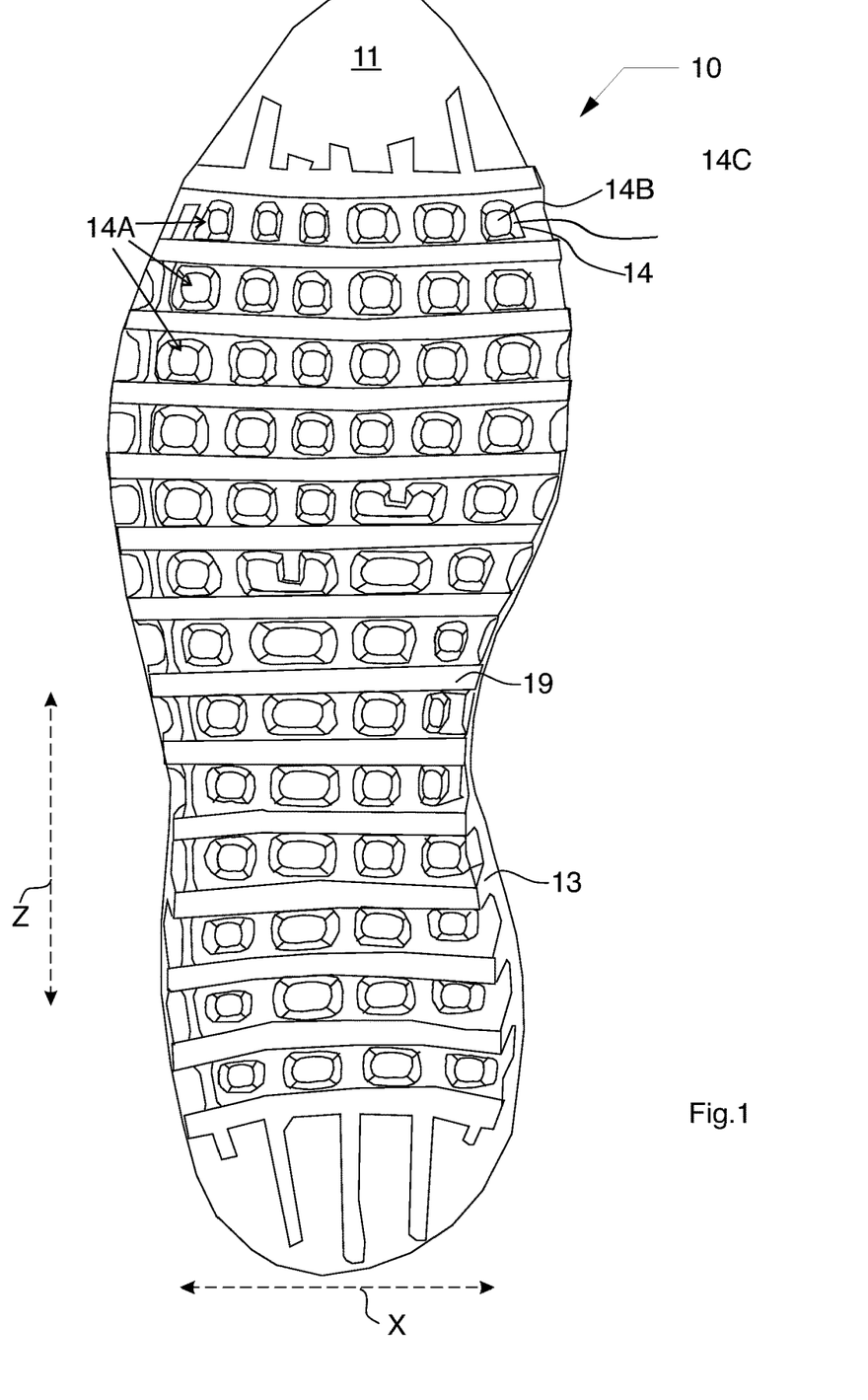
FIG. 1 shows a top down view of a foot facing surface of a primary sole part.

FIG. 1 shows a top down view of the foot facing surface 11 of the primary sole part 10, where the primary sole part 10 comprises a toe end 2 and a heel end 3, and a peripheral surface 13, which is adapted to surround the periphery of the primary sole part 10. The foot facing surface is also configured to face an upper (not shown in FIG. 1). The foot facing surface 11 comprises a plurality of openings 14 defining a plurality of open volumes 14A in the primary sole part 10, wherein the plurality of open volumes 14A have a closed end 14B. The plurality of open volumes extend in a vertical direction from the foot facing surface 11 towards the ground facing surface (not shown in FIG. 1) of the primary sole part 10. Each of the plurality of open volumes 14A is enclosed by one or more sidewalls 14C, the one or more sidewalls 14C extending from the foot facing surface 11, in a direction perpendicular to the foot facing surface 11, towards the ground facing surface. The plurality of open volumes are thus defined by the side walls 14C and the closed end 14B. The plurality of open volumes 14A may be in the form of a plurality of cavities, where the cavities are configured to receive an injected material of a secondary sole part. The plurality of open volumes and/or cavities 14A are adapted to increase the surface area of the foot facing surface 11 and thus a provide a larger surface area to which the injected material may bond with the primary sole part 10. The foot facing surface 11 is configured to be joined to an upper 8 by receiving the injected material, such that the injected material extends between a ground facing surface of the upper and the foot facing surface 11 of the primary sole part 10. By providing the primary sole part 10 with the plurality of open volumes 14A, the weight of the primary sole part 10 further reduces the weight of the primary sole part 10 compared to a solid primary sole part typically used for cemented sole assemblies. The edges of the open volumes 14A, such as the edges connecting the sidewalls 14C to each other and/or to the closed end 14B of the open volumes 14A and/or the edge of the openings 14 to the foot facing surface 11, may be rounded to reduce the risk of cracks in the material of the primary sole part 10 and/or to improve the flow of injected material into the open volumes 14A. Each of the plurality of open volumes may be tapered, such that the open volume is wider at the opening than at the closed end, to improve the flow of injected material into each of the plurality of open volumes. Thereby, the risk of air pockets or cracks forming in the injected material is reduced, which otherwise may lead to premature failure of the article of footwear.

Since the primary sole part has to be durable in order to withstand the friction between the ground facing surface of the primary sole part and the ground, the primary sole part is typically relatively heavy. By providing open volumes in the primary sole part and filling these volumes with a lighter material of the secondary sole part the weight of the assembled article of footwear may be reduced with improves user comfort.

By filling the plurality of open volumes 14A with injected material, a structural stiffness of a sole assembly comprising the primary sole part 10 and the secondary sole part 20 can be ensured, while the injected material may be softer than the material of the primary sole part 10, thus the comfort of the article of footwear may be improved by providing a dampening layer that can absorb shocks that occur during gait.

The plurality of openings 14 may be distributed from the heel area 5 of the foot facing surface to a forefoot area 4 of the foot facing surface 11 in a plurality of parallel rows extending in a lateral direction of the primary sole part 10. Each opening 14 of the plurality of openings 14 may be arranged at a predetermined distance from one or more second openings of the plurality of openings 14. The openings 14 are connected by solid sections of the primary sole part 10, wherein the solid sections form ridges 19 connecting the plurality of open volumes 14A. The ridges provide stability to the primary sole part 10.

Figure 2:
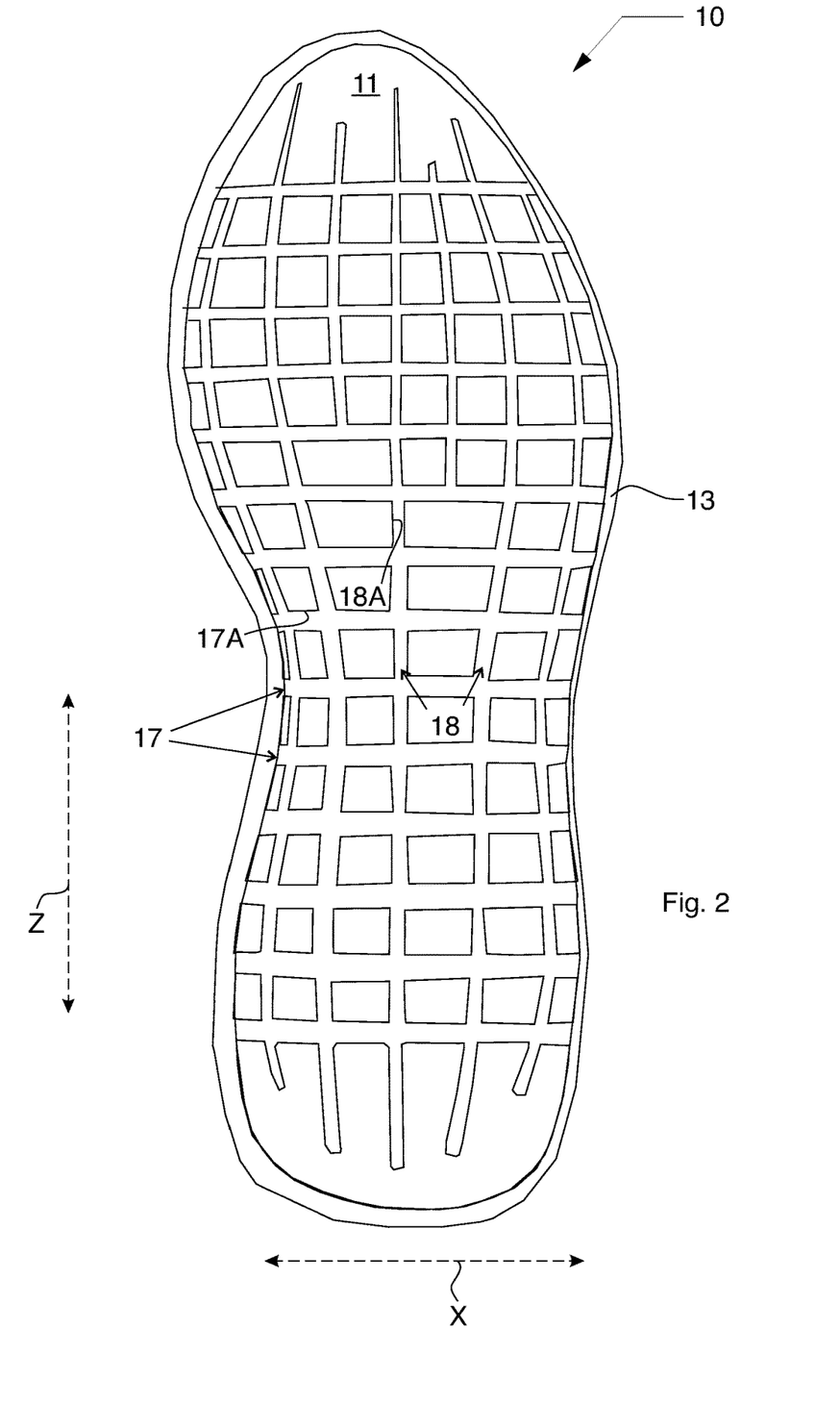
FIG. 2 shows a top down view of a ground facing surface of the primary sole part.

FIG. 2 shows a top down view of the ground facing surface 12 of the primary sole part 10. The primary sole part 1 comprises a first set of grooves 17 arranged on the ground facing surface 12, the first set of grooves 17 having a longitudinal extension in a lateral direction, such as along an axis X, of the ground facing surface 11. Each groove 17 on the ground facing surface 12 is located between a respective first and second row of openings 14 on the foot facing surface, such that an inner surface 17A of each groove 17 define an outer surface of one or more sidewalls 14C enclosing the one or more of the plurality of open volumes 14A. The grooves 17 are arranged in the solid sections of the primary sole part such that a bottom 17B of each groove forms a ground facing surface of a corresponding ridge 19 of the foot facing surface 11 of the primary sole part 10. The grooves 17 thus defines cut-outs in the solid section of the primary sole part 10, such as in the ridges 19, wherein the cut outs reduce the rigidity of the primary sole part in the areas of the cut outs, thereby increasing the flexibility of the sole. The grooves 17 increase the flexibility of the primary sole part 10 in the longitudinal direction of the primary sole part 10 along an axis Z. The solid sections connecting the openings 14 form flexible joints allowing the primary sole part, and/or the sole assembly to adapt to a shape of a foot of a user of the footwear 1, thereby increasing a walking comfort for the user of the footwear 1 during use.

As can be seen in FIG. 2, the primary sole part 10 may further comprise a second set of grooves 18 being arranged on the ground facing surface 12. The second set of grooves 18 may have a longitudinal extension, at least substantially, in a longitudinal direction along the axis Z of the ground facing surface 12, wherein each groove 18 is located between a respective first and second longitudinally extending row of openings 14. Although the grooves 18 are extending substantially in a longitudinal direction, the grooves may follow the shape of the primary sole part and thus comprise curved sections. Similar as for the grooves 17, an inner surface 18A of each groove 18 defines an outer surface of one or more sidewalls 14C enclosing the one or more open volumes 14A. By providing the ground facing surface 12 of the primary sole part with longitudinal grooves 18, the flexibility of the primary sole part 10 may also be increased in the lateral direction along the axis X of the primary sole part 10. As can be seen in FIG. 2, the ground facing surface 12 of the closed end 14C of the plurality of open volumes 14A having a closed end 14C comprises a ground contacting surface. Two adjacent inner surface 18A parts of a longitudinal groove 18 or two inner surface parts 17A of a lateral groove 17 may be separated by a predefined distance, where the distance defines the width of the longitudinal groove 18 or the lateral groove 17. The distance between the grooves may allow the inner surface parts 17A or 18A to move towards or away from each other when the primary sole part 10 and/or the secondary sole part 20 are bent along a longitudinal or lateral axis. By increasing the width of the groove 17, 18 it is possible to increase the distance where the inner surface parts 17A or 18A move towards each other. The width of the groove may be between 1 mm and 10 mm, or more preferably between 2 mm and 8 mm, or more preferably between 3 mm and 6 mm. Thus, the flexibility of the primary sole part 10 and/or the second sole part 20 is increased in a direction where the toe and/or the heel part is moved in a downward direction (towards the ground) while a central part of the sole part is maintained in its position (downwards direction). In traditional shoe production, soles may be slit in a longitudinal or lateral direction, where a slit does not allow for increased flexibility in a downwards direction, as the surface parts of the slit abut each other when the sole is in its relaxed position.

In one exemplary embodiment the second ground facing surface 12 comprises a ground contacting surface. The ground contacting surface 12 of the primary sole part may be the lowest part of the article of footwear 1, i.e. the outermost part of the primary sole part 10. The plurality of open volumes 14A may, seen from the ground facing surface 12, form a plurality of hollow closed end protrusions, wherein the ground facing surface of each of the closed ends 14B of the open volumes 14A form a top of one of the plurality of hollow closed end protrusions. The hollow closed end protrusions are separated by the first and second set of grooves 17, 18 in the ground facing surface 12, such that they create a pattern, treads or other surface elements on the ground facing surface 12 that are configured to increase traction, and/or friction of the article of footwear 1.

Figure 3:
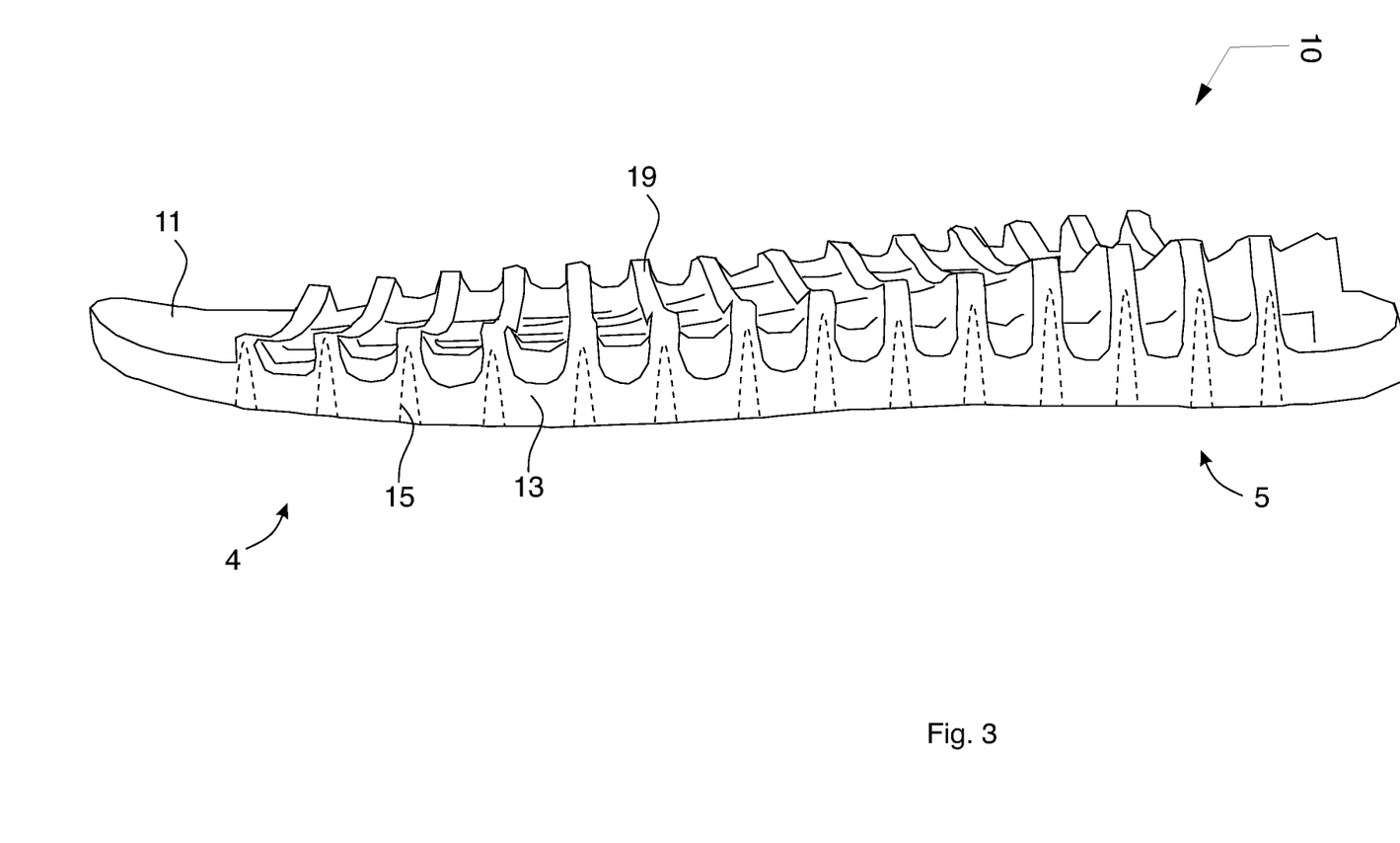
FIG. 3 shows a longitudinal side view of the primary sole part.

FIG. 3 shows a side view of the primary sole part 10 seen in the lateral direction of the primary sole part 10 along the axis X. As can be seen in FIG. 3, plurality of open volumes 14A are connected by solid sections of the primary sole part 10, wherein the solid sections form ridges connecting the cavities defined by the plurality of open volumes. The solid sections of the primary sole part 10, such as the ridges and the side walls 14C and the closed end 14B of the open volumes, are configured to be bonded to a secondary sole part (not shown in FIG. 3), e.g. during a moulding process of an article of footwear. In order to increase the surface area to which an injected material, such as e.g. the secondary sole part 20 or a tertiary sole part 30 can bond, the peripheral surface 13 of the primary sole part may extend uninterrupted around circumference of the primary sole part 10. The grooves 17 and 18 may thus be closed at the ends by the peripheral surface 13. After assembly of the article of footwear 1, e.g. after the moulding procedure, the ends of the grooves 17, 18 may however be opened by cutting through the peripheral surface 13 of the primary sole part 10, such that the peripheral surface 13 is also provided with cut outs 15 for increasing the flexibility of the sole assembly.

Each opening 14 of the plurality of openings 14 may be arranged at a predetermined distance from one or more second openings of the plurality of openings 14. The openings 14 are connected by solid sections of the primary sole part 10, wherein the solid sections form ridges 19 connecting the plurality of open volumes 14A. The ridges 19 may form pivot point around which two respective neighbouring lateral rows of open volumes may pivot, such that the primary sole part 10 may take a rounded shape around a lateral axis, such as the axis X. This allows the primary sole part 10 to adapt to the shape of a foot during gait which improves the comfort of the article of footwear 1 comprising the primary sole part 10.

The plurality of open volumes 14A may be distributed over the a majority of the foot facing surface 11 and may extend into the heel of the primary sole part 10, where the thickness of the primary sole part, such as the distance from the ground facing surface 12 to the foot facing surface 11 may be larger than e.g. in the forefoot area 4 of the primary sole part. Thus, a depth of the open volumes may be larger in the heel area 5 than in the forefoot area 4 of the primary sole part 10. The deeper open volumes in the heel area 5 may accommodate a thicker layer of injected material which may be positioned below the heel of the user, to increase the shock absorption during a heel strike during a gait. Thus, the height of the secondary sole part 20 in the heel area 5 may be larger than the height of the secondary sole part 20 in the forefoot area 4. The height may be seen as the distance between the ground facing surface 9 of the upper 8 and the foot facing surface 11 of the primary sole part 10 and/or the closed ends 14B of the plurality of open volumes 14A.

Figure 4:
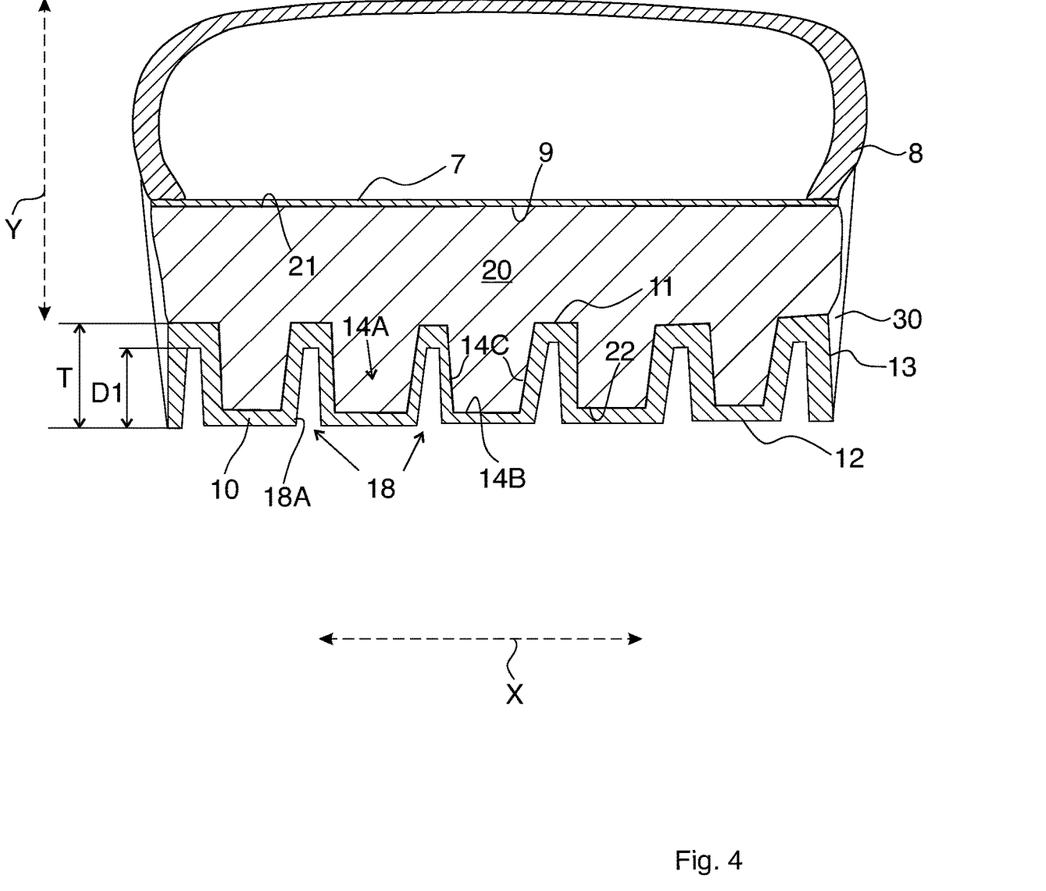
FIG. 4 shows a transverse cross-sectional view of a forefoot part of an article of footwear.

FIG. 4 shows a cross sectional view of an article of footwear 1 in the form of a shoe in a forefoot area of the shoe, where the shoe comprises a sole assembly comprising a primary sole part 10, a secondary sole part 20 and an upper 8.

The primary sole part 10 has a first foot facing surface 11, a second ground facing surface 12, and a peripheral surface 13. The first foot facing surface 11 comprises a plurality of openings 14, each opening defining a volume 14A in the primary sole part 10 extending in a vertical direction from the first foot facing surface 11 towards the second ground facing surface 12, wherein the volume has a closed end 14B having a closed end. The secondary sole part 20 has a second foot facing surface 22 and a third ground facing surface 23, and is arranged between the upper 8 and the primary sole part 10 and extends into the plurality of volumes 14A and/or openings 14 in the first foot facing surface 11 of the primary sole part 10.

The primary sole part 10 defines a mould cavity of the secondary sole part 20, where the plurality of open volumes 14A of the primary sole part 10 may define the mould cavity, or at least part of the mould cavity, of the secondary sole part 20. The foot facing surface 11 of the primary sole part 10 defines a lower boundary of the mould cavity, wherein the plurality of open volumes 14A in the foot facing surface 11 form part of the lower boundary of the mould cavity. In other words, the lower boundary of the mould cavity is defined by the foot facing surface 11, the side walls 14C and the closed end 14B of the plurality of open volumes 14A in the primary sole part 10. When the upper 8 has been positioned in its desired position relative to the primary sole part in the mould, the ground facing surface 9 of the upper 8 defines an upper boundary of the mould cavity. The upper 8 may comprise an insole 7, which insole 7 is attached to a lower end of the upper 8. The insole 7 has a foot facing part 7A and a ground facing part 7B, where the ground facing part 7B may be seen as the ground facing surface 9 of the upper 8. The tertiary sole part 30 or a side mould (not shown in FIG. 4) may define a lateral boundary of the mould cavity.

The secondary sole part 20 extends into the plurality of open volumes 14A of the primary sole part 10, where the secondary sole part extends in a vertical direction Y between the ground facing surface 9 of the upper 8 and the upper facing surface 11 of the primary sole part 10. The secondary sole part 20 thus connects the primary sole part 10 and the upper 8 to each other. The secondary sole part 20 may comprise an injected material where the injected material is adapted to expand inside the plurality of open volumes 14A so that the injected material fills out the entirety of one or more of the plurality of open volumes 14A, so that the plurality of open volumes 14A may be seen as a mould for the secondary sole part 20.

The secondary sole part 20 may be direct injection moulded into the plurality of open volumes 14A. During the moulding procedure the primary sole part 10 and the upper 8 may be placed in a mould and fixed relative to each other at a distance, such that the mould cavity for receiving the injected material is created between the first ground facing surface 9 of the upper 8 and the foot facing surface 11 of the primary sole 10. The plurality of open volumes 14A of the primary sole part 10 may be open to the mould cavity, such that the plurality of open volumes are in fluid connection with the mould cavity. During the moulding procedure a material is injected into the mould cavity and enters the plurality of open volumes 14A through the openings 14 in the foot facing surface 11 of the primary sole part 10, wherein the injected material fills out the entirety of the mould cavity and the plurality of open volumes 14A. Once the injected material has expanded and cured it forms the secondary sole part 20. The secondary sole part 20 may be made out of a material that is softer than the material of the primary sole part 10, where the secondary sole part may be seen as a shock absorbing part of the sole assembly.

The second set of grooves 18 may be arranged on the ground facing surface 12. The second set of grooves 18 may have a longitudinal extension, at least substantially, in a longitudinal direction along the axis Z of the ground facing surface 12, wherein each groove 18 is located between a respective first and second longitudinally extending row of openings 14. The inner surface 18A of each groove 18 defines an outer surface of one or more sidewalls 14C enclosing the one or more open volumes 14A. By providing the ground facing surface 12 of the primary sole part with longitudinal grooves 18, the flexibility of the primary sole part 10 may also be increased in the lateral direction along the axis X of the primary sole part 10. The ground facing surface 12 of the closed end 14C of the plurality of open volumes 14A having a closed end 14C may comprise a ground contacting surface. The outer surface of the one or more sidewalls 14C defined by the inner surface 18A form first lateral surfaces having a plane perpendicular to the lateral axis X, which first lateral surfaces improve the grip of the primary sole part 10 and the article of footwear 1 in the lateral direction of the article of footwear along the axis X during use. A depth D1 of the grooves 18 may be 75-97% of the thickness T of the primary sole part 10. The actual depth of the grooves may however vary based on the location on the primary sole part. In some embodiments, the thickness of the primary sole part 10 may be larger towards the heel end 3 of the primary sole part 10 than towards the toe end 2 of the primary sole part 10. As such, the depth of the groove 18 may also be larger towards a heel end 3 of the primary sole part 10 than towards the toe end 2 of the primary sole part.

The peripheral surface 13 of the primary sole part 10 may define an attachment area adapted to accommodate a tertiary sole part 30, optionally where the tertiary sole part 30 has a radial inwards facing surface for attachment to the peripheral surface 13 of the primary sole part 10 and an outwards facing surface. The peripheral part 13 of the primary sole part may comprise an attachment area, which may be adapted to attach to a tertiary sole part 30. The tertiary sole part may be attached to a surface of the peripheral part 13 of the primary sole part 10. The tertiary sole part 30 may thus surround the peripheral part of the primary sole part 10. The tertiary sole part 30 may be of the same material as the primary sole part or may be of a different material having different properties than the primary sole part 10. The tertiary sole part 30 may further be attached to the upper 8, such that the tertiary sole part 30 may provide a peripheral seal for the sole assembly, thereby providing a weather proofing preventing moisture from entering between the primary sole part 10, the secondary sole part 20 and the upper 8 and/or may create a predefined aesthetic look for the article of footwear. The tertiary sole part 30 may be a strip of material, wherein the strip of material may be cemented to the peripheral part of the primary sole part 10, the secondary sole part 20 and the upper 8, or may be moulded to the primary sole part 10 and the upper 8 by means of the injected material.

Figure 5:
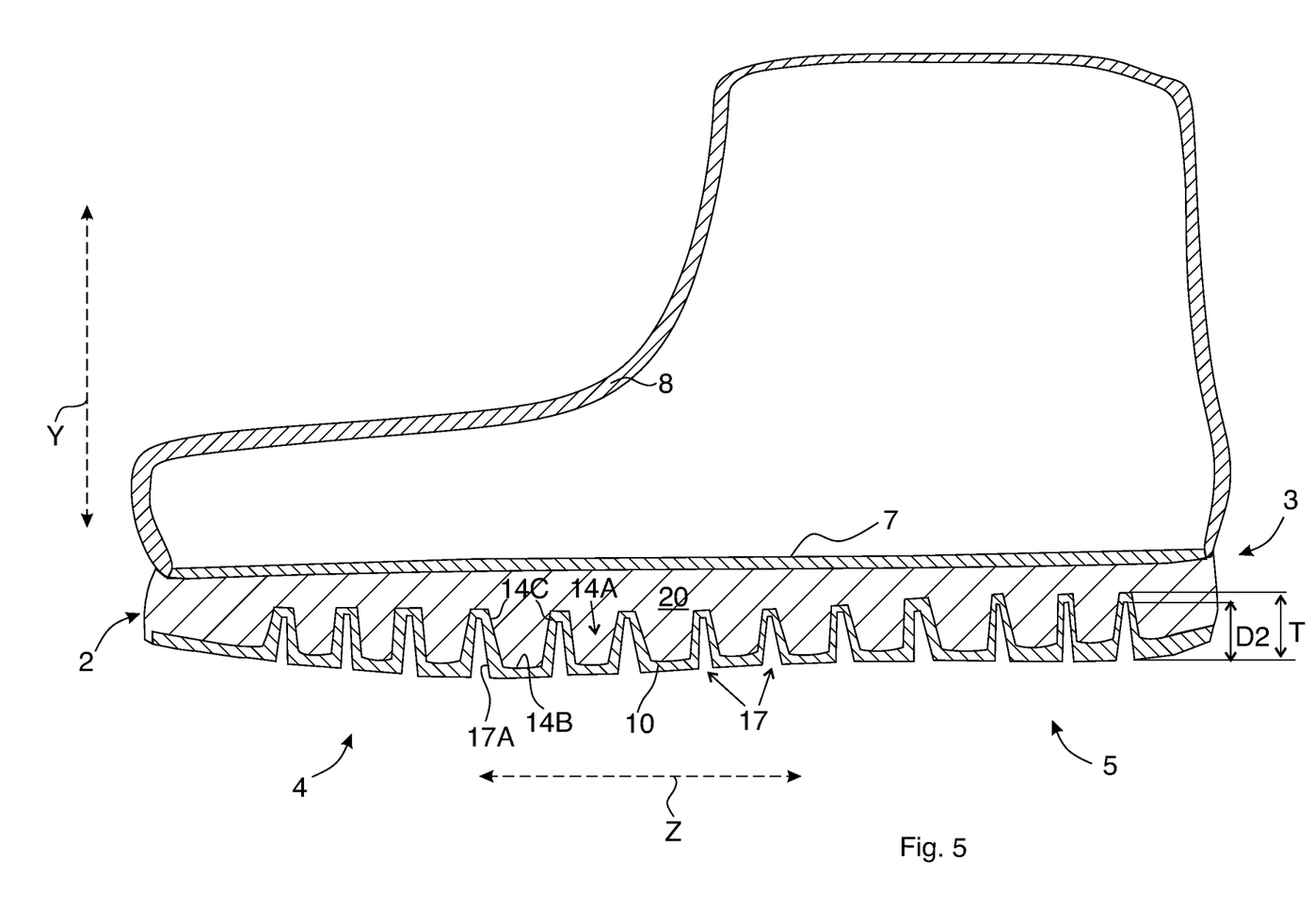
FIG. 5 shows a longitudinal cross-sectional view of the article of footwear.

FIG. 5 shows a cross sectional view of the article of footwear 1, taken along the longitudinal axis Z, where the article of footwear comprises the sole assembly comprising the primary sole part 10, the secondary sole part 20 and the upper 8 as shown in FIG. 4. The primary sole part 10 extends from a toe end 2 of the article of footwear 1 towards a heel end 3 of the article of footwear 1, where the upper 8 and the insole 7 are attached to the primary sole part 10 via the secondary sole part 20. The secondary sole part 20 extends uninterrupted from the toe end 2 to the heel end 3, creating a dampening layer that extends between the primary sole part 10 and the upper 8 along the entire longitudinal length Z of the article of footwear. The plurality of openings 14 and/or open volumes 14A extend, i.e. are arranged, from the heel end 3 of the primary sole part 10 to the toe end 2 of the primary sole part 10 in a plurality of parallel rows extending in a lateral direction, along the axis X perpendicular to the longitudinal axis Z, of the primary sole part 10.

Each lateral row of openings and/or open volumes 14A may be separated by a lateral groove 17 out of the first set of grooves 17 arranged on the ground facing surface of the primary sole part 10, hence the ground facing surface of the primary sole part may comprise a plurality of lateral grooves 17. The first set of grooves 17 may have a longitudinal extension in a lateral direction along the axis X of the ground facing surface 12. The inner surface 17A of each groove 17 defines an outer surface of one or more sidewalls 14C enclosing the one or more open volumes 14A. The inner surface 17A of the lateral grooves 17 are substantially perpendicular to the inner surface 18A of the longitudinal grooves 18. Arranging the openings 14 in parallel rows extending in the lateral direction creates ridges 19 of solid material between the rows, which allows for a positioning of the lateral grooves 17 in the ground facing surface 12 of the primary sole part without interfering with the secondary sole part 20 extending into the open volumes 14A. By providing the ground facing surface 12 of the primary sole part 10 with the lateral grooves 17, the flexibility of the primary sole part 10 may also be increased in the longitudinal direction along the axis Z of the primary sole part 10. The outer surface of the one or more sidewalls 14C defined by the inner walls 17A of the first set of grooves 17 form second lateral surfaces having a plane perpendicular to the longitudinal axis X, which second lateral surfaces can take up forces in the longitudinal direction of the article of footwear 1 the improve the grip of the primary sole part 10 and the article of footwear 1 in the longitudinal direction during use. A depth D2 of the grooves 18 may be 75-97% of the thickness T of the primary sole part 10. The actual depth of the grooves may however vary based on the location on the primary sole part. In some embodiments, the thickness of the primary sole part 10 may be larger towards the heel end 3 of the primary sole part 10 than towards the toe end 2 of the primary sole part 10 in order to provide a higher dampening at the heel end, such as in the heel area 5. As such, the depth of the groove 18 may also be larger towards a heel end 3 of the primary sole part 10 than towards the toe end 2 of the primary sole part. As can be seen in FIG. 5 the second ground facing surface 12 may comprise or may be a ground contacting surface. The ground contacting surface may be located in a heel area 5 and in a forefoot area 4 or may, as shown in FIG. 5, be located over the entire ground facing surface 12 of the primary sole part 10.

The use of the terms "first", "second", "third" and "fourth", "primary", "secondary", "tertiary" etc. does not imply any particular order but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

LIST OF REFERENCES

1 Article of footwear
2 Toe end
3 Heel end
4 Forefoot area
5 Heel area
7 Insole
8 Upper
9 First ground facing surface
10 Primary sole part
11 First foot facing surface
12 Second ground facing surface
13 Peripheral surface
14 Opening
14A Open volume
14B Closed end
14C Side wall of open volume
15 Cut out in peripheral surface
17 Lateral groove
18 Longitudinal groove
19 Ridge
20 Secondary sole part
21 Secondary foot facing surface
22 Third ground facing surface
30 Tertiary sole part

The invention claimed is:
1. An article of footwear comprising:
an upper having a first ground facing surface;
a primary sole part having a first foot facing surface, and a second ground facing surface, the first foot facing surface comprising a plurality of openings, each opening of the plurality of openings defining a volume extending in a vertical direction from the first foot facing surface towards the second ground facing surface having a closed end; and a secondary sole part having a second foot facing surface and a third ground facing surface, wherein the secondary sole part is arranged between the upper and the primary sole part and extends into the plurality of openings in the first foot facing surface of the primary sole part, wherein the plurality of openings extend from a heel area of the primary sole part to a forefoot area of the primary sole part in a plurality of laterally extending rows of openings, wherein the primary sole part further includes:
- a first set of grooves extending along the second ground facing surface in a lateral direction of the second ground facing surface, the first set of grooves being spaced apart from each other by the plurality of laterally extending rows of the plurality of openings, and
- a second set of grooves extending along the second ground facing surface in a longitudinal direction of the second ground facing surface, such that the second set of grooves transversely intersects the first set of grooves, wherein respective inner surfaces of the first set of grooves define respective longitudinally facing sidewall surfaces of the plurality of openings, wherein respective inner surfaces of the second set of grooves define respective laterally facing sidewall surfaces of the plurality of openings, whereby the plurality of openings are enclosed on all lateral sides, and wherein the primary sole part defines a mould cavity of the secondary sole part, where the plurality of openings of the primary sole part define the mould cavity of the secondary sole part.

2. The article of footwear in accordance with claim 1, wherein the secondary sole part is direct injection moulded into the plurality of openings.

3. The article of footwear in accordance with claim 1, wherein the secondary sole part extends from the first ground facing surface of the upper to the first foot facing surface of the primary sole part, and/or where the secondary sole part defines a second foot facing surface that is attached to the first ground facing surface of the upper and a third ground facing surface that is attached to the first foot facing surface of the primary sole part.

4. The article of footwear in accordance with claim 1, wherein the primary sole part comprises a peripheral surface defining an attachment area adapted to accommodate a tertiary sole part, and where the tertiary sole part has a radially inward facing surface for attachment to the peripheral surface of the primary sole part and an outwards facing surface.

5. The article of footwear in accordance with claim 1, wherein the second ground facing surface comprises a ground contacting surface.

6. The article of footwear in accordance with claim 5, wherein the ground contacting surface is in a heel area and a forefoot area.

7. The article of footwear in accordance with claim 4, wherein a tertiary sole part surrounds the peripheral surface of the primary sole part.

8. The article of footwear in accordance with claim 1, wherein the plurality of openings are distributed from the heel area of the foot facing surface to the forefoot area of the foot facing surface in a plurality of parallel rows extending in a longitudinal direction of the primary sole part.

* * * * *